United States Patent [19]

Park

[11] Patent Number: 5,289,989
[45] Date of Patent: Mar. 1, 1994

[54] TAPE HUB DRIVING SYSTEM WITH MECHANISM TO PREVENT TAPE SLACKENING DURING MODE CHANGE

[75] Inventor: Il M. Park, Seoul, Rep. of Korea

[73] Assignee: Gold Star Co., Ltd., Seoul, Rep. of Korea

[21] Appl. No.: 732,465

[22] Filed: Jul. 18, 1991

[30] Foreign Application Priority Data

Jul. 30, 1990 [KR] Rep. of Korea .............. 11213/1990

[51] Int. Cl.⁵ .................... G11B 15/24; B65H 16/10
[52] U.S. Cl. ................................ 242/201; 242/204
[58] Field of Search .............. 242/200, 201, 204; 360/74.3, 96.3, 96.4

[56] References Cited

U.S. PATENT DOCUMENTS

| | | | |
|---|---|---|---|
| 4,814,912 | 3/1989 | Kleinlein et al. | 242/201 X |
| 5,070,422 | 12/1991 | Sasaki et al. | 360/96.3 X |

FOREIGN PATENT DOCUMENTS

| | | | |
|---|---|---|---|
| 3606769 | 9/1987 | Fed. Rep. of Germany | 360/963 |
| 0140008 | 12/1978 | Japan | 360/96.4 |
| 0175175 | 10/1983 | Japan | 360/96.3 |
| 0036356 | 2/1984 | Japan | 242/201 |
| 0103541 | 6/1985 | Japan | 242/201 |
| 0016267 | 1/1987 | Japan | 360/96.3 |
| 0292765 | 12/1990 | Japan | 360/74.3 |
| 1447793 | 9/1976 | United Kingdom | 242/201 |

*Primary Examiner*—Daniel P. Stodola
*Assistant Examiner*—John Rollins
*Attorney, Agent, or Firm*—Fish & Richardson

[57] ABSTRACT

A reel driving apparatus for a video camera, which is constructed with a minimum of structural elements, resulting in achieving simplicity in construction and reducing the manufacturing cost and weight of the product. The apparatus comprises an idle gear mounted on a support plate to be pivotally movable therewith between a feed reel and a take-up reel gears to selectively transmit power from a motor to the reel gears, direction rotating gear disposed in intermeshing engagement with the take-up reel gear, and a stopper protruding from the support plate to control rotation of the direction rotating gear, thereby preventing a tape from instantaneously slackening during a change of the direction of the travel in the tape in the tape during winding and unwinding operations.

2 Claims, 4 Drawing Sheets

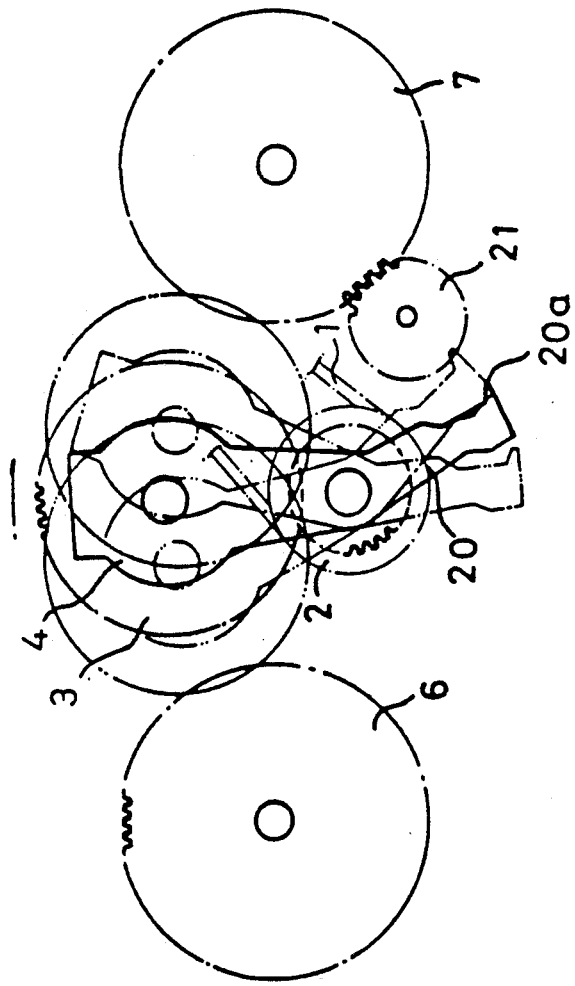

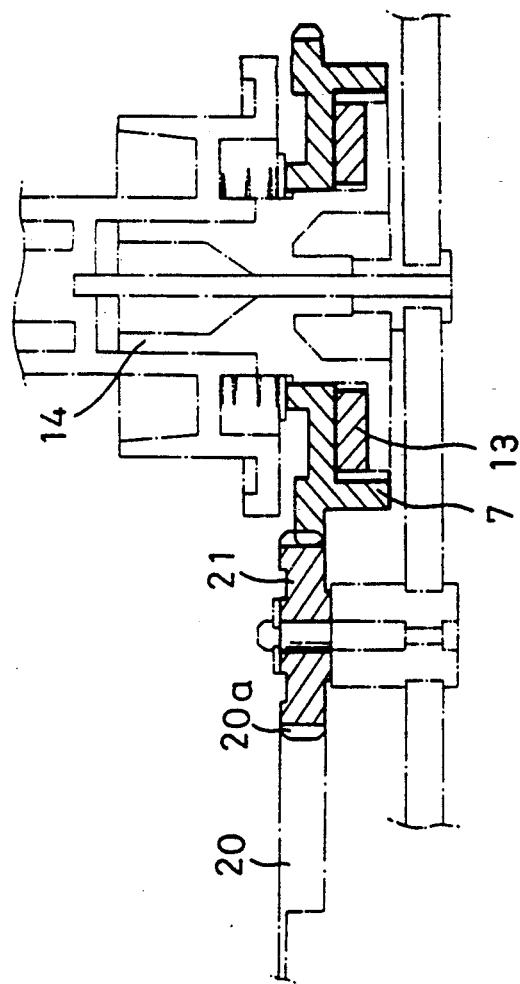

TAPE HUB DRIVING SYSTEM WITH MECHANISM TO PREVENT TAPE SLACKENING DURING MODE CHANGE

BACKGROUND OF THE INVENTION

1. Field of the Invention

This invention relates to a reel driving apparatus for a miniature video camera in which a tape frequently needs to be instantaneously advanced backward reversed during its forward advance.

2. Description of the Prior Art

The prior reel driving apparatus for a miniature video camera is of the type shown in FIGS. 1 and 2 of the accompanying drawings, in which a drive unit functioning to wind and unwind a tape (not shown) extending between a feed reel and a take-up reel comprises, as shown in FIG. 1, a belt pulley (2) rotated by a belt(1) transmitting power from a motor (not shown) to the pulley, and an idle gear(3) being in intermeshing engagement with a gear of the belt pulley (2) to be rotated thereby. The belt pulley and the idle gear are mounted on a single support plate(4) which is pivotally movable about a center shaft(5) of the belt pulley (2) between a feed reel gear(6) and a take-up reel rear(7), which gears are disposed each on the opposite sides of the center shaft.

With this arrangement, when the support plate(4) is rotated in a counter-clockwise direction as viewed in FIG. 1 so that the idle gear (3) mounted thereon is engaged with the feed reel gear (6), the tape feed reel may be rotated via a gear train comprising the gear of the belt pulley(2), the idle gear(3) and the feed reel gear(6), thereby unwinding the tape therefrom.

Conversely, when the support plate(4) is rotated in a clockwise direction, the take-up reel may be rotated via a gear train comprising the gear of the belt pulley (2), the idle gear(3) and the take-up reel gear(7), thereby winding the tape thereon.

In addition, in contrast to a common video cassette recorder, the miniature video camera is provided with a rotary gear assembly (9) comprising a direction rotating gear(8) disposed in intermeshing engagement with the take-up reel gear(7) so as to control the rotation of the take-up reel depending upon a rotational direction of the take-up reel gear(7). In the miniature video camera, the reason for controlling the rotation of the take-up reel by means of the rotary gear assembly is as follows. Generally, the miniature video camera repeatedly carries out picture-taking and stop operations for the purpose of its use. Every time the camera is operated, the tape needs to be repeatedly advanced forward and reversed depending upon various modes of the operation.

Therefore, in the course of such forward advances and reverses of the tape, especially when the forward advancing tape is temporarily stopped, thereafter is slightly moved backward and remains in the pause condition according to a change of the operation from a picture recording mode to a temporary stop or pause mode, because the inertia force disappears and then acts again on the tape, the tape is not unwound uniformly from the take-up reel. In such case, the amount of the tape being wound again on the feed reel is not as great as the amount of tape excessively unwound from the take-up reel due to temporary over-rotation of the take-up reel. In order to prevent the slackening of the tape, therefore, an attempt has been made to apply tension to the tape on the take-up reel by controlling the rotation of the reel.

The construction and operation of the rotary gear assembly functioning to prevent the tape from slackening due to the temporary over-rotation of the take-up reel as discussed above will now be described in more detail below.

As shown in FIG. 2, the rotary gear assembly(9) having the one-way rotating gear(8) held in intermeshing engagement with the take-up reel gear(7) comprises three tapered rectangular holes(10) formed in the rotary gear assembly in circumferentially spaced relation to each other, cylindrical bearings (11) received one in each of the taper holes (10) and a compression spring (12) disposed in each one of the taper holes(10) to apply its biasing force to each one of bearings(11). With this construction, in the picture recording mode and a play mode of the video camera, in which the idle gear (3) is engaged with the take-up reel gear(7), as the take-up reel gear is rotated in a clockwise direction, the bearings (11) are moved to and positioned at the wide portions of the taper holes(10). Thus, the one-way rotating gear(8) may be rotated without interference, and therefore the take-up reel gear(7) may be rotated smoothly. In this condition, when the mode of the operation is changed to a review mode in which the tape is reversed, or the pause mode in which the tape must be slightly reversed the idle gear (3) is engaged with the feed reel gear (6) to rotate the feed reel in a counter-clockwise direction, and thus the take-up reel (14) is rotated in a counter-clockwise direction through a cassette tube (not shown). At this point, because the one-way rotating gear(8) of the rotary gear assembly (9) has a tendency to rotate in a clockwise direction contrary to the counter-clockwise rotation of the take-up reel, the bearings (11) are moved to the narrow portions of the taper holes (10), thereby impeding the rotation of the one-way rotating gear(8).

Consequently, the take-up reel gear(7) engaged with the rotating gear(8) is also prevented from rotating, and only the take-up reel(14) is rotated while being subjected to frictional force by a friction clutch (13) disposed between the take-up reel(14) and the take-up reel gear(7). As a result, the take-up reel tightens the tape wound thereon, thereby preventing the tape from slackening. This prior apparatus is however disadvantageous in that the rotary gear assembly is complex in construction and requires a large number of parts, resulting in increasing the manufacturing cost and weight of a product.

SUMMARY OF THE INVENTION

With the foregoing drawbacks of the prior art apparatus in view, it is an object of the present invention to provide an improved reel driving apparatus for a video camera, which is constructed with simple structural elements and can effectively function to prevent a tape from slackening during a change of its traveling direction.

To achieve the above object, there is provided according to the present invention a reel driving apparatus for a video camera, comprising an idle gear movable between a feed gear and a take-up reel gear to selectively transmit power to these gears, a direction rotating gear disposed in intermeshing engagement with the take-up reel gear, and a support plate mounted on the idle gear and having an integral stopper protruding from its lower end to be engaged with the direction rotating gear during a reversal of a tape, thereby restricting rotation of the take-up reel gear one direction while stopper is engaged with the direction rotating gear.

BRIEF DESCRIPTION OF THE DRAWINGS

The invention will now be described further, by way of example, with reference to the accompanying drawings, in which:

FIG. 3 is a diagrammatic plan view of a reel driving apparatus according to the present invention; and FIG. 4 is a cross-sectional view for explaining operation of the apparatus of the present invention.

DESCRIPTION OF THE PREFERRED EMBODIMENT

Figure 1:
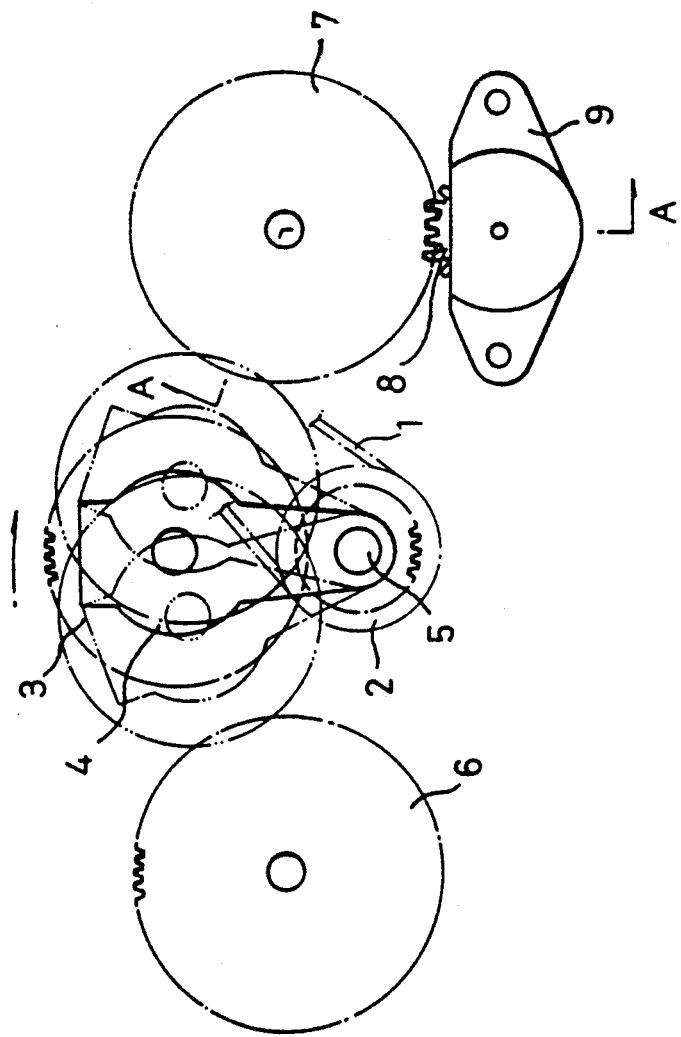
FIG. 1 is a diagrammatic plan view of a reel driving apparatus of the prior art.
Figure 2:
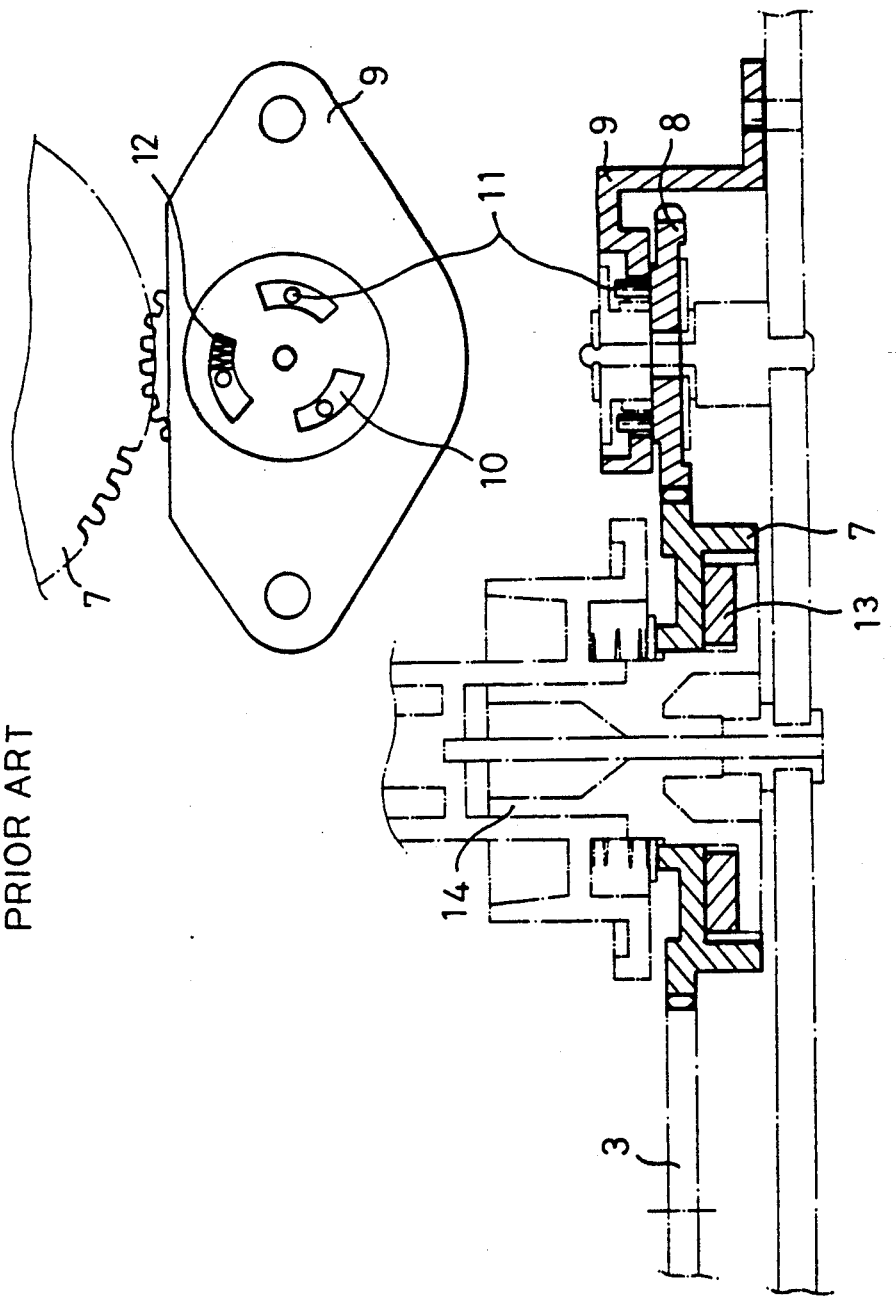
FIG. 2 is a cross-sectional view taken along line A—A of FIG. 1, including a plan view of a rotary gear assembly of the prior apparatus.

Referring to FIG. 3 illustrating a diagrammatic plan view of a reel driving apparatus of the present invention, the apparatus basically comprises a belt pulley (2) having a gear rotated by a power transmission belt(1), an idle gear(3) being in intermeshing engagement with the gear of the belt pulley (2) to be rotated thereby, and single support plate(4) carrying the idle gear(3) thereon and pivotally movable about a center shaft of the belt pulley (2) between a feed reel gear (6) and a take-up reel gear (7), thereby enabling the idle gear (3) to be selectively engaged with the feed reel gear or the take-up reel gear so as to rotate a feed reel or a take-up reel for rewinding or winding a tape. The basic construction and function of the apparatus are substantially the same as those of the prior art as described above. The novel features of the invention are that a stopper (20) having a pawl (20a) at its distal end extends from a lower end of the support plate (4) at a given angle with respect to a longitudinal axis of the support plate to pivotally move toward and away from the take-up reel gear(7) in response to pivotal movement of the support plate for selectively engaging the idle gear(3) with the feed reel gear(6) or the take-up reel gear(7), and that a direction rotating gear (21) is disposed between the stopper (20) and the take-up reel gear (7) and in intermeshing engagement with the take-up reel gear.

With this construction, when the support plate(4) is in a neutral position as indicated by the solid line in FIG. 3, that is, when the idle gear (3) is engaged with neither the feed reel gear (6), nor the take-up reel gear(7), the stopper (20) is distant from the direction rotating gear(21). In this position, if the idle gear (3) is moved to the take-up reel gear (7) to be engaged therewith in a play mode, the stopper is conversely moved away from the gear (21), so that the direction rotating gear and the take-up reel gear may be smoothly rotated free from restraint.

On the other hand, in a review mode, when the idle gear(3) is pivotally moved in a left direction as viewed in FIG. 3 to be engaged with the feed reel gear(6), the stopper (20) is moved to a position as indicated by the two-dot-and-dash lines in FIG. 3, in a right direction (as viewed in the figure) contrary to the leftward movement of the idle gear, so that the pawl (20a) of the stopper is put between the teeth of the direction rotating gear (21), thereby restricting the rotation of the direction rotating gear. Thus, the take-up reel gear(7) may not be rotated. And as shown in FIG. 4, take-up reel(14) may be rotated only while being subjected to frictional force applied by a friction clutch(13). This frictional force provides tension to the tape on take-up reel, thereby preventing it from slackening.

This invention is therefore advantageous since the stopper is formed integrally with the support plate and is pivotally movable contrary to the pivotal movement of the idle gear selectively transmitting the power to the feed and take-up reels and thereby controls the rotation of the direction rotating gear which is rotatable in intermeshing engagement with the take-up reel gear. The stopper thereby prevents the tape from instantaneously slackening during a change of the direction of the travel of the tape. Thus, the apparatus is constructed with a minimum of parts in comparison with the prior apparatus, resulting in providing simplicity in construction and reducing the manufacturing cost and total weight of the product.

Having thus described a preferred embodiment of the invention, it should be understood that the invention is not to be limited to the specific construction and arrangement shown. It will be apparent to those skilled in the art that modifications may be made without departing from the spirit and scope of the invention as defined in the appended claim.

What is claimed is:

1. In a reel driving apparatus for a video camera for use in advancing and reversing a tape, an apparatus comprising:
    an idle gear drivable by the power transmitted from a motor thereto,
    a support plate on which the idle gear is mounted,
    a feed reel gear to transmit power to a feed reel,
    a take-up gear reel gear to transmit power to a take-up reel,
    the support plate being pivotally mounted to be movable between the feed reel and take-up reel gears so that the idle gear selectively engages and transmits power directly to these gears,
    a direction rotating gear mounted in intermeshing engagement with the take-up reel gear,
    a stopper integral with and protruding from the support plate and positioned so as to be engaged directly with the direction rotating gear when the idle gear directly engages the feed reel gear for reversing the tape such that, in this position, the stopper prevents the rotation of the direction rotating gear and the take-up reel gear.

2. In the reel driving apparatus for a video camera in claim 1,
    a take-up reel mounted to normally rotate with the take-up reel gear,
    a friction clutch mounted between and in contact with the take-up reel and the take-up reel gear so that when the stopper is engaged with the direction rotating gear and prevents the rotation of the take-up reel gear, the take-up reel is allowed to rotate by the friction clutch but with sufficient friction to provide tension to the tape and prevent it from slackening while being rearwardly advanced.

* * * * *